United States Patent
Kelly et al.

(10) Patent No.: US 10,289,864 B2
(45) Date of Patent: May 14, 2019

(54) SECURITY TOOL TO PREVENT SENSITIVE DATA LEAKAGE

(71) Applicant: International Business Machines Corporation, Armonk, NY (US)

(72) Inventors: Alexander J. Kelly, Romsey (GB); Alexander D. S. Mirski-Fitton, Chandlers Ford (GB); Edwin P. J. Moffatt, Hursley (GB); Ross B. Pavitt, Headley (GB)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 113 days.

(21) Appl. No.: 14/985,491

(22) Filed: Dec. 31, 2015

(65) Prior Publication Data

US 2017/0193246 A1    Jul. 6, 2017

(51) Int. Cl.
| | | |
|---|---|---|
| G06F 21/00 | (2013.01) | |
| G06F 21/62 | (2013.01) | |
| G06F 21/83 | (2013.01) | |
| G06F 21/84 | (2013.01) | |

(52) U.S. Cl.
CPC .......... G06F 21/6245 (2013.01); G06F 21/83 (2013.01); G06F 21/84 (2013.01)

(58) Field of Classification Search
CPC .................................................. G06F 21/6245
USPC ........................................................ 726/28
See application file for complete search history.

(56) References Cited

U.S. PATENT DOCUMENTS

| | | | | |
|---|---|---|---|---|
| 7,865,839 B2* | 1/2011 | Heikes | .................... | H04L 51/04 715/805 |
| 8,220,047 B1* | 7/2012 | Soghoian | ................ | H04L 51/14 709/206 |
| 8,392,992 B1* | 3/2013 | Spertus | ................. | G06F 21/556 726/23 |
| 8,407,784 B2 | 3/2013 | Troyansky | | |
| 8,732,821 B1 | 5/2014 | Spertus | | |
| 2004/0128552 A1* | 7/2004 | Toomey | ................... | G06F 21/57 726/22 |
| 2006/0005142 A1* | 1/2006 | Karstens | ............... | G06F 3/0481 715/767 |
| 2008/0104712 A1* | 5/2008 | Oliver | ................. | G06F 21/6227 726/27 |

(Continued)

FOREIGN PATENT DOCUMENTS

WO        2010023477 A1    4/2010

OTHER PUBLICATIONS

Authors et al., IBM "Method and Mechanism for Preventing Information Leakage: Password Input Field Detection and Protection", IP.com, December 25, 2008, p. 1-4.

*Primary Examiner* — Harris C Wang
(74) *Attorney, Agent, or Firm* — Cantor Colburn LLP; Michael O'Keefe

(57) ABSTRACT

Embodiments include method, systems and computer program products for a security tool to prevent data leakage. In some embodiments, it may be determine that a first application has been initiated. A focus change from the second application to the first application may be detected. Input data provided by a user may be detected. It may be determined that the input data comprises sensitive data. An action may be executed in response to determining that the input data comprises sensitive data.

9 Claims, 3 Drawing Sheets

(56) References Cited

U.S. PATENT DOCUMENTS

| | | | |
|---|---|---|---|
| 2009/0094551 A1* | 4/2009 | Alkov | G06F 21/31 |
| | | | 715/802 |
| 2013/0080952 A1* | 3/2013 | Dolph | G06F 17/243 |
| | | | 715/767 |
| 2013/0268867 A1* | 10/2013 | Martin | G06F 3/048 |
| | | | 715/752 |
| 2014/0150108 A1* | 5/2014 | Low | G06F 21/60 |
| | | | 726/26 |
| 2016/0132679 A1* | 5/2016 | Li | G06F 21/6245 |
| | | | 726/23 |
| 2017/0193246 A1* | 7/2017 | Kelly | G06F 21/6245 |

* cited by examiner

US 10,289,864 B2

SECURITY TOOL TO PREVENT SENSITIVE DATA LEAKAGE

BACKGROUND

The present disclosure relates to data security, and more specifically, to methods, systems and computer program products for a security tool to prevent data leakage.

Users may use different types of devices that have various applications executing on them. A user may execute multiple applications concurrently on their devices, with some running in the background or may be executing in the foreground where the user may directly interact with an interface of the application. An application is in focus when a graphical user interface or graphical component, such as a window, is selected and ready to receive input from a user. Focus misappropriation or focus stealing may occur when the focus is changed from a first application to a second application without a request from the user to do so. All keyboard inputs may then be redirected to the focus-stealing application. Focus stealing applications pose security risks because a user may inadvertently provide sensitive information or agree to actions without realizing the focus stealing application is receiving input rather than the application that previously had the focus.

SUMMARY

In accordance with an embodiment, a computer-implemented method may be provided. The method may include determining a first application has been initiated; detecting a focus change from a second application to the first application; detecting input data provided by a user; determining that the input data comprises sensitive data; and executing an action in response to determining that the input data comprises sensitive data.

In another embodiment, a computer program product may include a non-transitory storage medium readable by a processing circuit and storing instructions for execution by the processing circuit for performing a method comprising determining an first application has been initiated; detecting a focus change from a second application to the first application; detecting input data provided by a user; determining that the input data comprises sensitive data; and executing an action in response to determining that the input data comprises sensitive data.

In another embodiment, a system may include a processor in communication with one or more types of memory, wherein the processor may be configured to determine a first application has been initiated; detect a focus change from a second application to the first application; detect input data provided by a user; determine that the input data comprises sensitive data; and execute an action in response to a determination that the input data comprises sensitive data.

BRIEF DESCRIPTION OF THE DRAWINGS

The forgoing and other features, and advantages of the disclosure are apparent from the following detailed description taken in conjunction with the accompanying drawings in which.

DETAILED DESCRIPTION

In accordance with exemplary embodiments of the disclosure, methods, systems and computer program products for a security tool to prevent data leakage. This disclosure is directed to detecting when an application has been initiated, whether it take focus from another application, and detect whether sensitive information is inadvertently passed to the newly launched application.

The methods and systems described herein are directed to preventing accidental data leakage to focus-stealing or focus-misappropriating applications. The security tool for preventing data leakage may be integrated into an application or may be a stand-alone tool.

The systems and methods described herein are directed at a security tool to prevent accidental leakage of sensitive data without having to rely on changes being made at a system level, but rather on an application level.

In one example, a user may be working in a Unix terminal and issue a command which requires root access password. The user may type in the root access password, press enter, and nothing happens. The user may have accidentally typed their root password into a chat window that popped up and stole focus from the terminal. To prevent such occurrences, the security tool may detect when sensitive information, such as a password or identifying information (e.g., social security number, driver's license number, etc.) has been typed into a focus-stealing application. Knowing that a password has been entered, the security tool may take an action, such as generating a message warning the user, generating a prompt that requires confirmation before the information is used by the focus-stealing application, or the like.

The security tool may detect that focus has been or needs to be stolen by an application. The security tool may determine whether sensitive information (e.g., password, social security number, etc.) has been provided by the user, and take an action to prevent the accidental data leakage of sensitive information. The security tool may determine that sensitive has been provided by checking the input data against passwords in a password management system, intelligent detection of password-like strings (e.g. non-dictionary words with capital letters and numbers), determining that the current field being typed into is a password field (e.g. denoted as such by OS or web browser or a terminal with echo off), or the like. The security tool may take action to stop the leakage of sensitive data. Examples may include, but are not limited to, generating a window that requests confirmation from the user (e.g. "What you are about to send looks like it may contain plaintext passwords—are you sure you want to continue?"), replacing the password string with other content (e.g., ****** or other random/predefined replacement), briefly disabling functionality of an application to allow the user time to review the data before it is used by the application, or the like.

Figure 1:
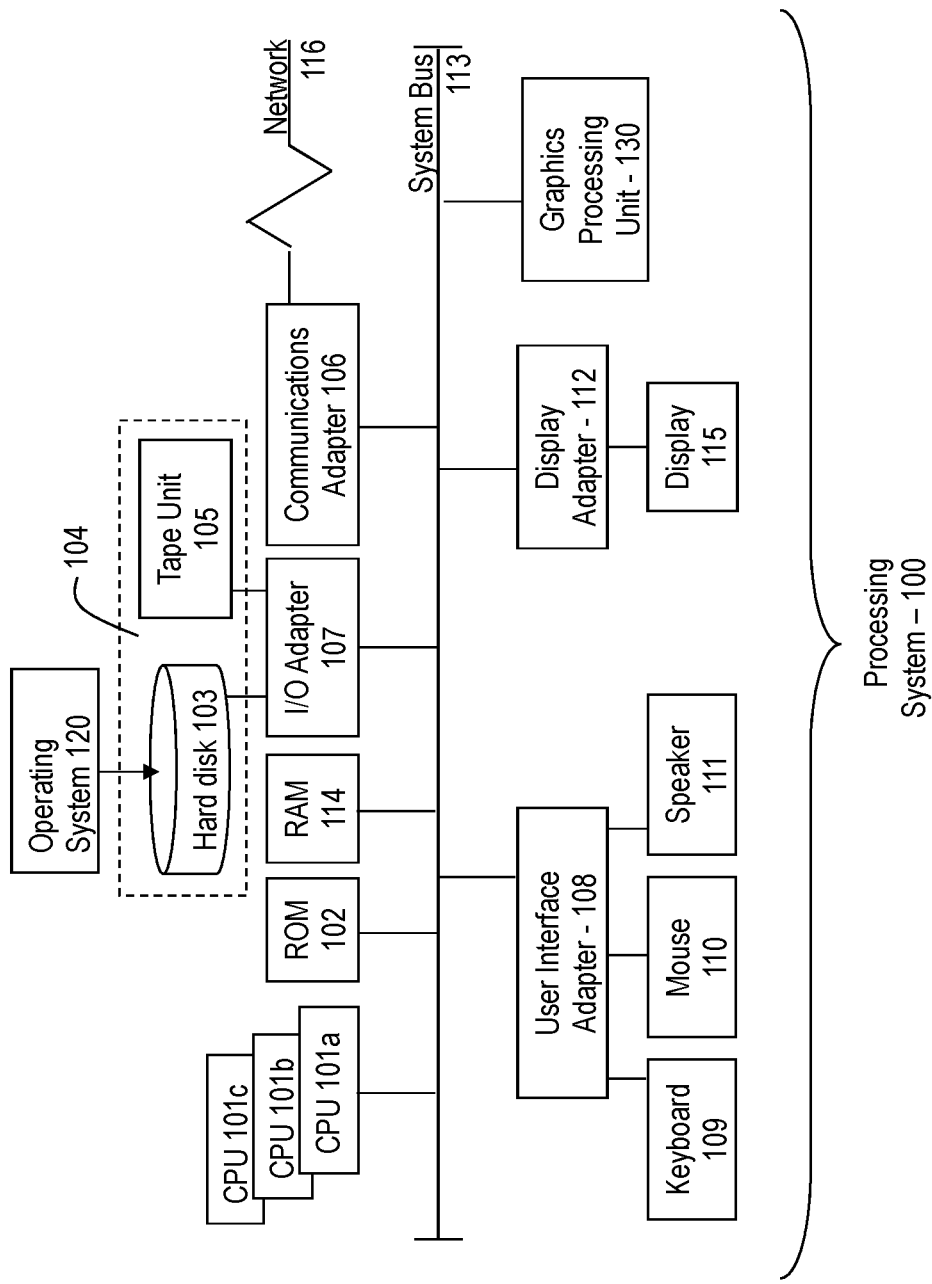
FIG. 1 is a block diagram illustrating one example of a processing system for practice of the teachings herein.

Referring to FIG. 1, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 1 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adapter 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics-processing unit 130. Graphics processing unit 130 is a specialized electronic circuit designed to manipulate and alter memory to accelerate the creation of images in a frame buffer intended for output to a display. In general, graphics-processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system such as the AIX® operating system from IBM Corporation to coordinate the functions of the various components shown in FIG. 1.

Figure 2:
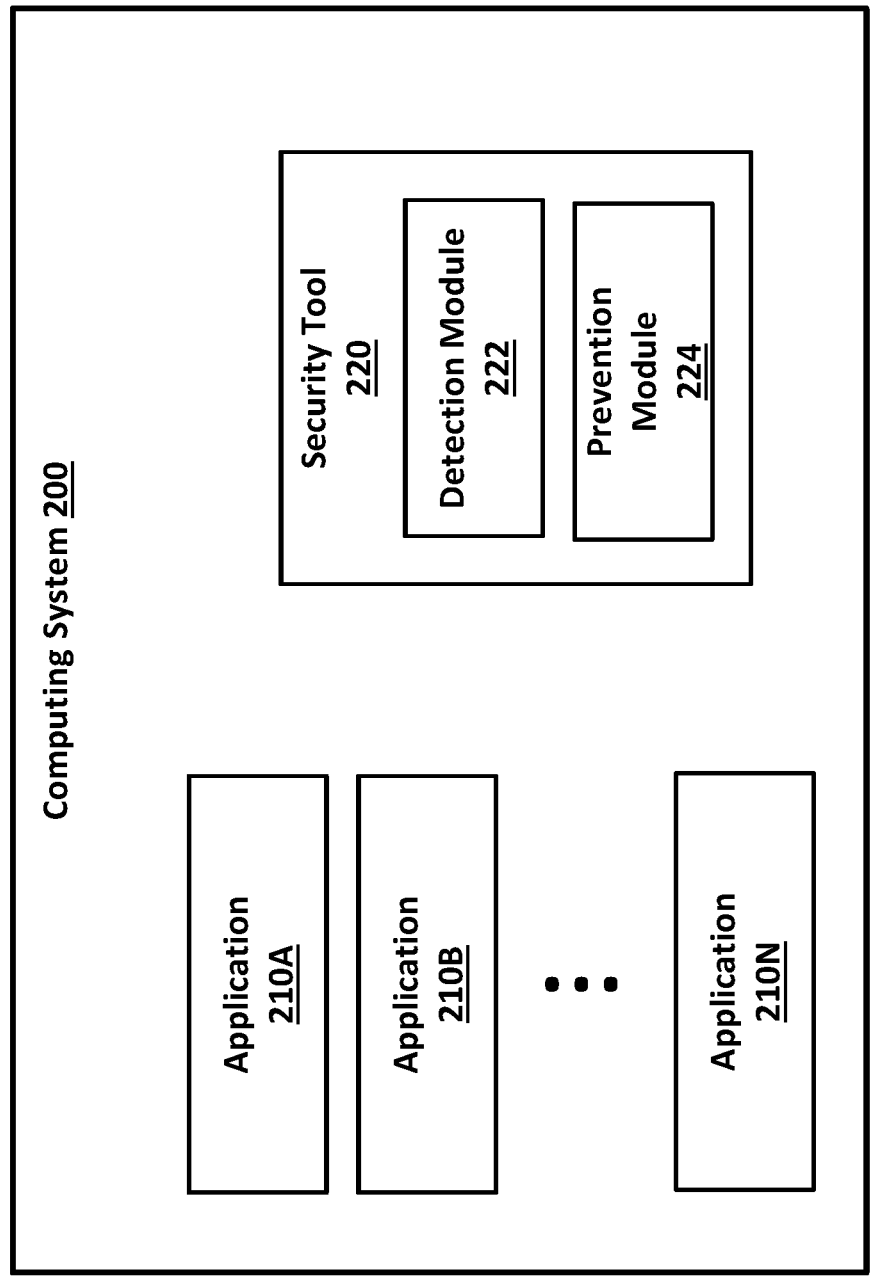
FIG. 2 is a block diagram illustrating a computing system in accordance with an exemplary embodiment.

Referring now to FIG. 2, a computing system 200 in accordance with an embodiment is illustrated. As illustrated, the computing system 200 may include, but is not limited to, one or more applications 210A-210N (collectively 210) and/or a security tool 220. The security tool 220 may include a detection module 222 and a prevention module 224. Although the security tool 220 is depicted outside of the applications 210 in the computing system 200, in some embodiments, the security tool 220 may be integrated as a component of an application 210.

The applications 210 may include computer-readable instructions that in response to execution by the processor(s) 101 cause operations to be performed including executing different functionality specific to the application(s) 210. An example of a functionality specific to the application(s) 210 may include calendar functionality, event management functionality, conferencing functionality, and the like.

In some embodiments, the computing system 200 may include a security tool 220. The security tool 220 may be an integrated component of an application 210 or may be a stand-alone application. In some embodiments, the security tool 220 may include a detection module(s) 222, which may include computer-readable instructions that in response to execution by the processor(s) 101, cause operations to be performed including determining that an application 210 has been initiated or is now in focus. The detection module 222 may detect whether an application 210 has stolen or misappropriated focus from another application 210. The detection module 222 may also detection whether the application 210 that now has focus has received input (e.g., keyboard input) and whether the keyboard input contain sensitive information, such as a password or other personally identifying information, such as a social security number or the like. The detection module 222 may transmit a determination that input data received by the application 210A with focus may contain sensitive data to a prevention module 224.

In some embodiments, the computing system 200 may include a prevention module(s) 224, which may include computer-readable instructions that in response to execution by the processor(s), 101 cause operations to be performed including receiving an indication from the detection module 222 that an application 210 that has acquired focus may have also acquired sensitive data. The prevention module 224 may execute one or more actions to prevent accidental data leakage to the application 210. Examples of actions may include informing the user, returning the focus to the application 210 that was previously in focus, disabling the functionality of the application with the sensitive data for a predetermine period of time, and the like.

Figure 3:
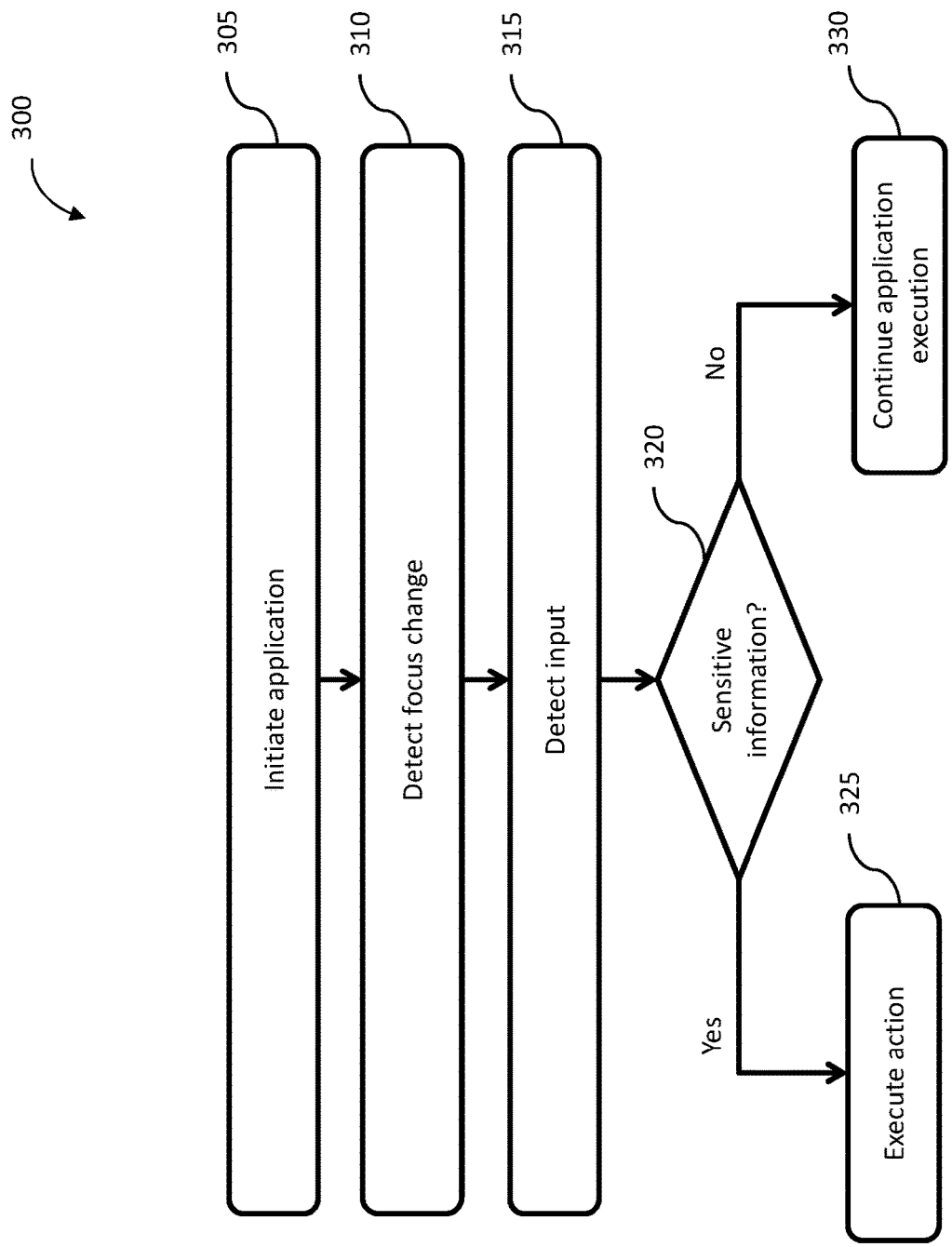
FIG. 3 is a flow diagram of a method for a security tool to prevent data leakage in accordance with an exemplary embodiment.

Referring now to FIG. 3, a flow diagram of a method 300 for a security tool to prevent data leakage in accordance with an exemplary embodiment is shown.

At block 305, the detection module 222 may determine that a first application 210A has been initiated.

At block 310, the detection module 222 may detect a focus change from a second application 210B to the first application 210A. In some embodiments, the detection module 222 may detect a focus change between applications by obtaining information from an operating system of the computing system 200. In some embodiments, the detection module 222 may poll the applications 210 in the foreground to determine whether an application has focus.

At block 315, the detection module 222 may detect input data provided by a user. In some embodiments, the detection module 222 may determine that keyboard inputs have been received by the first application 210A.

At block 320, the detection module 222 may determine whether the input data comprises sensitive data. In some embodiments, the detection module 222 may obtain information indicating that an active field of the second application 210B is a password field. For example, an operating system or a web browser of the computing system 200 may provide the security tool 220 with data indicating that the field the user was previously typing in was a password field.

In some embodiments, the detection module 222 may determine that the input data includes sensitive data by analyzing the input data. In some embodiments, the detection module 222 may determine that the input data comprises a non-dictionary word. In some embodiments, the detection module 222 may determine that the input data includes a combination of letters, numbers, or symbols. In some embodiments, the detection module 222 may use a regular expression (regex) checker to determine that the input data is a non-dictionary word.

In some embodiments, the detection module 222 may communicate with a password management system of the computing system 200. The detection module 222 may check whether the input data matches or partially matches any passwords that may be stored using the password management system.

If at block 320, the detection module 222 determines that that the input data comprises sensitive data, then the method may proceed to block 325. At block 325, the prevention module 224, may execute an action in response to determining that the input data comprises sensitive data. Examples of actions may include the prevention module 224 generating and displaying a prompt to the user. The prompt may be a message requesting confirmation to the user. The prompt may include a message that indicates that input data is sensitive and is to be used by the first application. The prompt may request confirmation or denial of the message from the user. In some embodiments, the user may confirm that the input data may be used by the first application 210A. In some embodiments, the prevention module 224 may receive a denial from the user. In response to receiving the denial, the prevention module 224 may prevent the first application 210A from using the input data.

In some embodiments, the prevention module 224 may highlight the input data on a graphical component of the first application 210A. The prevention module 224 may generate and present a message to the user indicating that the input data may be sensitive.

In some embodiments, the prevention module 224 may, in response to determining that the input data contain sensitive information may disable the functionality of the first application 210A for a predetermined amount of time. The predetermine amount of time may be adjusted by the user. By disabling the functionality of the first application 210A for a brief amount of time, the user may be provided with sufficient time to realize that the first application 210A has focus and review the input data to determine a next action.

If at block 320, the detection module 222 determines that that the input data does not comprise sensitive data, then the method may proceed to block 330. The security tool 220 may complete its processing and permit the first application 210A to proceed.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   determining a first application has been initiated;
   detecting a focus change from a second application to the first application;
   detecting input data provided by a user;
   determining that the input data comprises sensitive data by comparing the input data to a password management system to determine that there is a match or a partial match; and
   executing an action in response to determining that the input data comprises sensitive data to prevent accidental data leakage to the first application, wherein the action includes:
      highlighting, by a prevention module on a graphical component of the first application, the input data that is determined to comprise sensitive data;
      disabling functionality of the first application for a pre-determined amount of time;
      facilitating presentation of a message requesting confirmation to the user during the pre-determined amount of time, wherein the message indicates that input data is sensitive and is to be used by the first application;
      receiving a denial of confirmation from the user; and
      preventing the first application from using the input data.

2. The computer-implemented method of claim 1, wherein determining that the input data comprises sensitive data further comprises:
   obtaining information indicating that an active field of the second application is a password field.

3. The computer-implemented method of claim 1, wherein determining that the input data comprises sensitive data further comprises:
   analyzing the input data to determine that the input data comprises a non-dictionary word comprising letters, numbers, or symbols.

4. A computer program product comprising a non-transitory storage medium readable by a processing circuit and storing instructions for execution by the processing circuit for performing a method comprising:
   determining a first application has been initiated;
   detecting a focus change from a second application to the first application;
   detecting input data provided by a user;
   determining that the input data comprises sensitive data by comparing the input data to a password management system to determine that there is a match or a partial match; and
   executing an action in response to determining that the input data comprises sensitive data to prevent accidental data leakage to the first application, wherein the action includes;
      highlighting, by a prevention module on a graphical component of the first application, the input data that is determined to comprise sensitive data;
      disabling functionality of the first application for a pre-determined amount of time;
      facilitating presentation of a message requesting confirmation to the user during the pre-determined amount of time, wherein the message indicates that input data is sensitive and is to be used by the first application;
      receiving a denial of confirmation from the user; and
      preventing the first application from using the input data.

5. The computer program product of claim 4, wherein determining that the input data comprises sensitive data further comprises:
   obtaining information indicating that an active field of the second application is a password field.

6. The computer program product of claim 4, wherein determining that the input data comprises sensitive data further comprises:
   analyzing the input data to determine that the input data comprises a non-dictionary word comprising letters, numbers, or symbols.

7. A system, comprising:
   a hardware processor in communication with one or more types of memory, the hardware processor configured to:
      determine a first application has been initiated;
      detect a focus change from a second application to the first application;
      detect input data provided by a user;
      determine that the input data comprises sensitive data by comparing the input data to a password management system to determine that there is a match or a partial match; and
      execute an action in response to a determination that the input data comprises sensitive data to prevent accidental data leakage to the first application, wherein the action includes:

highlighting, by a prevention module on a graphical component of the first application, the input data that is determined to comprise sensitive data;

disabling functionality of the first application for a pre-determined amount of time;

facilitating presentation of a message requesting confirmation to the user during the pre-determined amount of time, wherein the message indicates that input data is sensitive and is to be used by the first application;

receiving a denial of confirmation from the user; and preventing the first application from using the input data.

8. The system of claim 7, wherein, to determine that the input data comprises sensitive data, the hardware processor is further configured to:

obtain information indicating that an active field of the second application is a password field.

9. The system of claim 7, wherein, to determine that the input data comprises sensitive data, the hardware processor is further configured to:

analyze the input data to determine that the input data comprises a non-dictionary word comprising letters, numbers, or symbols.

* * * * *